United States Patent [19]
Boyum et al.

[11] 3,742,100
[45] June 26, 1973

[54] PROCESS FOR THE PREPARATION OF ANHYDROUS MgCl$_2$ PRILLS

[75] Inventors: Oystein Boyum, Skien; Karsten Eigil Eriksen, Eidanger; Per Solberg, Porsgrunn; Kjell Wallin Tveten, Bole, all of Norway

[73] Assignee: Norsk Hydro a.s., Oslo, Norway

[22] Filed: Oct. 27, 1970

[21] Appl. No.: 84,537

[30] Foreign Application Priority Data
Oct. 29, 1969 Norway................................ 4293/69

[52] U.S. Cl..................................... 264/14, 263/13
[51] Int. Cl............................................... B01k 2/04
[58] Field of Search................. 264/13, 14, DIG. 51, 264/5; 34/10

[56] References Cited
UNITED STATES PATENTS

| | | |
|---|---|---|
| 3,130,225 | 4/1964 | Friend.................................. 264/14 |
| 3,577,560 | 5/1971 | Lawrence et al..................... 264/13 |
| 3,127,249 | 3/1964 | Cuthbert et al...................... 264/13 |

*Primary Examiner*—Robert F. White
*Assistant Examiner*—J. R. Hall
*Attorney*—Wenderoth, Lind and Ponack

[57] ABSTRACT

The process prepares magnesium chloride prills suitable for the electrolytic production of magnesium from a melt. Molten magnesium chloride hydrate having a moisture content corresponding to from about 3.8 to about 6.2 moles of H$_2$O per mole of MgCl$_2$ is converted into droplets which are solidified to form prills. The prills are dehydrated to the desired low-moisture magnesium chloride or substantially anhydrous magnesium chloride.

12 Claims, No Drawings

PROCESS FOR THE PREPARATION OF ANHYDROUS MGCL PRILLS

The invention relates to a process for preparing magnesium chloride suitable for the electrolytic production of magnesium metal, and more particularly it relates to a process for the preparation of magnesium chloride in the form of firm prills suitable to be charged as such to the electrolytic cell.

The term "prill" is here intended to mean small bodies above about 0.15 mm in size, thus excluding the very small particles that are produced by the spray-drying technique.

Magnesium metal is preponderantly produced by molten salt electrolysis of magnesium chloride. According to a well known electrolytic process, the magnesium chloride is anhydrous chloride, while another well known electrolytic process employs hydrated chloride corresponding to about 2 moles of $H_2O$ per mole of $MgCl_2$.

When preparing anhydrous and low-moisture magnesium chloride for electrolysis, it is of great interest, as is well known, to utilize magnesium chloride brines obtained in the industrial treatment of various natural salt deposits and saline waters. Commercial magnesium chloride brines usually are saturated aqueous solutions of magnesium chloride, corresponding to 10–12 moles of $H_2O$ per mole of $MgCl_2$.

In the preparation of magnesium chloride for electrolysis it is known to spray-dry the aqueous chloride solution in a high tower in counter-current with for instance air, whereby fine magnesium chloride powder can be obtained containing for instance 0.5–1 mole of $H_2O$ per mole of $MgCl_2$. While this method provides a high degree of dehydration it entails a very great loss in the form of a fine dust which is carried away by the drying gas used and which in a great part cannot be recovered economically. The particle size is mostly below 15 microns. The loss in the form of dust would be about 20 percent. The product obtained can be accumulated by melting.

Another known process comprises spray drying a concentrated magnesium chloride solution to a moisture content corresponding to the dihydrate or a little lower and effecting the further dehydration in a fluidized bed in the presence of HCl gas. In this process the particle size is 20–100 microns, and with such particle sizes the fluidized bed treatment must be carried out at very low gas velocities. As a consequence thereof the dimension of the fluidized bed apparatus will have to be quite large. To avoid this it has been proposed to treat the spray dried powder between rolls to form flakes, which are then broken up to the extent desired, whereafter the product thus obtained is subjected to fluidized bed drying with HCl gas. The process is thereby made considerably more complex.

Further it is known to reduce the moisture content of magnesium chloride brine by spraying a molten magnesium chloride hydrate into a fluidized bed of partly dehydrated magnesium chloride particles, which for instance can be recirculated solid particles, or they can be crystals of for instance the hexahydrate of magnesium chloride which is readily available. In this process the dehydration in principle is presumed to occur as the molten phase hits the solid phase particles so that evaporation takes place from the surface thereof. Also in these latter processes for the dehydration of magnesium chloride the loss in the form of dust is considerable.

By means of the present invention the abovementioned drawbacks are avoided.

The process of the invention has enabled magnesium chloride hydrate to be directly made into prills of a very suitable size and having a quite satisfactory mechanical strength, both for the further dehydration to anhydrous or to low-moisture magnesium chloride as well as for the final utilization of the prills as feed material to the electrolytic cells.

Surprisingly it has turned out that prills of the abovementioned type can be obtained when molten magnesium chloride hydrate having a moisture content corresponding to from about 3.8 to about 6.2 moles of $H_2O$ per mole $MgCl_2$ is made into granules or prills by prilling the melt from a centrifuge or through a perforated plate or other suitable prilling means to form droplets which are converted into (prills solidified spheroidal grains), by cooling in a gaseous or liquid cooling medium, whereafter the prills obtained are dried to give the desired low-moisture magnesium chloride, or the anhydrous magnesium chloride as the case may be.

The first step in the process of the invention thus in short, is to subject magnesium chloride melt of the above-mentioned degree of hydration to a prilling process, and the invention is based on the finding which we have ascertained by extensive research and experiments, that one can thereby provide granules which are excellently suitable for being progressively dehydrated as well as for the eventual use as electrolytic cell feed material for the production of magnesium.

Other aspects of the invention will be apparent from the following detailed description including examples showing how to carry out the process of the invention in practice.

As far as we know, prilling of magnesium chloride hydrates has not been previously described. By means of the process of the invention one can produce prills of suitable size and having excellent properties with respect to the further treatment to produce anhydrous or low-moisture magnesium chloride. The prills are free-flowing and storable in storage tanks without lumping, they have high resistance to abrasion and they combine high strength with a very satisfactory dehydratability using the preferred dehydration methods such as fluidized bed drying or shaft drying. This applies to both drying with air in an introductory dehydration phase at relatively low temperatures as well as to drying with HCl gas, if so desired, in a subsequent dehydration phase at higher temperature. In all these various steps of operations the loss in the form of dust is very low, the overall loss being of the order of magnitude of 1 percent by weight, in many instances considerably lower than 1 percent. In addition it should be noted that even this small loss can be substantially recovered in an economical way and returned to the process, if so desired.

Within the fertilizer industry in which the process of prilling is used extensively, it is generally experienced that the solidified prills preferably should not be subjected to a subsequent drying treatment since the mechanical strength of the prills and their resistance to abrasion will readily be adversely affected. Sometimes this will happen even when the degree of dehydration is relatively low, for instance a few percent.

In the process according to the invention the degree of dehydration during drying will be up to about 50 percent by weight. It will be understood then, that the prilled product is subjected to a rather extreme dehydration. In spite of this we have found that, surprisingly, it is possible to produce prills of magnesium chloride hydrates which can well be subjected to the desired drying treatment, the necessary transporation etc. without considerable breakage and resulting in an unexpectedly low amount of dust. We have found that prills of magnesium chloride hydrates as obtained according to the invention are superior to pellets and briquettes in the above-mentioned respects.

The process of prilling is not a drying operation, and although the liquified $MgCl_2$ is prilled according to the invention substantially consists of a salt which is rather strongly hydrated and which can be said to be dissolved in its own water of crystallization, the prilling process does not result in any considerable loss of moisture to the cooling medium. The dehydration is effected in one or more separate subsequent steps.

In the following, the process of the invention will be further described and illustrated by means of examples.

The process of the invention can be subdivided into three main parts:

a. Selection of magnesium chloride hydrate (the starting material), that is a hydrate of a suitable degree of hydration.

b. Prilling of the molten hydrate.

c. Drying of the prills obtained.

Following are a few comments in respect of each of these three main parts. (The degree of hydration sometimes will be indicated by numerals which are not integers. In such cases we are dealing with mixtures of at least two different hydrates).

a. The more water the hydrate contains, the lower its solidification temperature. We have found that the hexahydrate can well be prilled using air of room temperature as the cooling medium. Although it is possible to prill magnesium chloride hydrate having a higher content of water than 6 moles of $H_2O$ per mole of $MgCl_2$, such higher hydrate is not a good choice. According to the invention we prefer to prill magnesium chloride hydrate having 4.0–5.8 moles of $H_2O$ per mole of $MgCl_2$. More particularly we prefer to prill hydrates having 4.8–5.8 moles of $H_2O$ per mole of $MgCl_2$ when relatively large prills are to be produced, such as prills having a size of about 5 mm. It has turned out that with this degree of hydration, and using conventional prilling methods such as sieve plate and centrifuge prilling, the obtainment of well-defined, mechanically strong and readily dehydratable prills is facilitated. When it is desired to produce relatively small prills, such as 0.5–2 mm prills, we prefer to start from hydrates having 4.0–4.7 moles of $H_2O$ per mole of $MgCl_2$. It has turned out that also with this relatively low degree of hydration it is readily possible under controlled conditions to obtain well defined, mechanically strong and readily dehydratable prills when using prilling methods suitable for these prill sizes, such as spraying the melt through nozzles employing a moderate pressure and a disintegrating gas.

A satisfactory prilled product can be obtained using magnesium chloride hydrate of a degree of hydration down to about 3.8 and up to about 6.2 moles of $H_2O$/mole of $HgCl_2$. When evaporating the brine to a lower degree of hydration than corresponding to the tetrahydrate, difficulties will arise mainly because solid material starts to precipitate. The melt will change from being a clear and readily flowable liquid into an unclear whitish and very viscous melt that does not any longer lend itself to prilling. When the brine to be prilled has a higher moisture content than corresponding to the hexahydrate, difficulties are likely to arise due to lumping of the prilled product unless the prills are given an extra cooling treatment before going to the storage tank.

b. As already mentioned, the prilling can be carried out using conventional technique. Preferably, prilling is carried out using counter-current cooling with a suitable gas, for instance air. The temperature rise of the cooling gas in the prilling chamber depends on a number of factors, such as the spraying temperature of the melt, that exit temperature of the prilled product and on the ratio of the cooling gas flow rate to the nozzle flow rate, that is, the amount of cooling gas used per kilogram of prills.

An example is included here for the purpose of illustration:

Magnesium chloride tetrahydrate was prilled on a technical scale in a pilot plant to produce prills of a size largely between 0.5 and 2.0 mm using a brine temperature of 195° C. The temperature of the prilled product was 85° C, and the ratio of cooling air flow rate to the nozzle flow rate was 20 $Nm^3$/kilogram of prills. The inlet temperature of the cooling air at the bottom of the prilling tower was 21° C, the relative humidity 40 percent, the exit temperature 34° C, the temperature rise thus being 13° C. In this example the moisture lost in the prilling tower was less than 0.1 mole of $H_2O$ per mole of $MgCl_2$.

Thus, if the starting material available is a saturated magnesium chloride brine then the latter must be dehydrated, for instance by evaporation, practically speaking to a degree of hydration desired for the prills.

When preparing relatively large prills, for instance 5 mm prills, one can use centrifuge spraying or sieve plate spraying. Hitherto, we have achieved the best results using the latter technique. The spraying operation advantageously can be carried out using a very moderate pressure. The latter is not critical and can be for instance from a few mm Hg to 300 mm Hg. Usually the size of the prills will then be approximately twice the size of the diameter of the nozzle opening. As will appear from the examples below, prill sizes of 4–6 mm can be obtained in a 25 m tower. The necessary height will however, depend on the velocity and temperature of the cooling air. If it is desired to make prills that are larger than 6 mm, then normally it will be advantageous to use a prilling tower higher than 25 mm, for instance 50 m, or more. When producing such relatively large prills it can be advantageous, as known per se, within the prilling technology, to introduce seed crystals to the brine prior to prilling or to blow such seeds into the prilling chamber. The addition of such seeds to the brine is an effective way of achieving a rapid cooling of the brine immediately after spraying, for instance to effect cooling from the evaporation temperature to the spraying temperature desired.

When preparing relatively small prills, for instance 0.5–2 mm prills, we have obtained the best results using air disintegration of a jet of brine. In this case, it is preferred to use a somewhat higher pressure than mentioned above, for instance 200–600 mm Hg. Using this technique the nozzle opening is normally considerably larger than the size of the prills; compare the examples to follow.

Sub-sized prills or dust of magnesium chloride tetrahydrate can be utilized as seeding material by being introduced together with disintegration air. It was found that such seeding technique usually would entail a certain shifting of the grain size distribution towards coarser fractions. The amount of seeding material used can for instance be about 10 percent by weight of the brine used.

Satisfactory prilling also can be achieved by discharge nozzle spraying without the use of disintegration air. The discharge pressure in this case suitably can be for instance 5 kg/cm².

Irrespective of the size of the prills to be produced, it is desirable to have strict control of the temperature of the brine to be prilled. As a general rule, it can be stated that the brine temperature immediately before discharge should be near or a little higher than the temperature at which an initial solidification would occur. The desired brine temperature thus depends on the moisture content of the brine, that is, its degree of hydration. In the case of brine having a relatively high moisture content, such as the hexahydrate, there will be a wide temperature interval between the melting point of the brine and its boiling point. In this case the discharge temperature of the brine will be less critical than in the case of the tetrahydrate, said interval being only about 10° C in the latter case.

Since the discharge temperature of a brine to be prilled is preferably selected so as to be close to the temperature of initial solidification the preferred discharge temperature of the brine will not only depend on the degree of hydration, but also on the purity of the brine. Other salts present in the brine will usually be largely constituted of chlorides of alkali and alkaline earth metals such as sodium, potassium, lithium, calcium and barium.

These other salts will often, at least in a great measure, be desirable constituents of the magnesium chloride feed material to be charged to the electrolytical cell. However, the amounts present of these salts can vary since, as is well known in the art, a number of electrolyte modifications are used in the industry, and cell house practice also could be a consideration in this connection. As it is $MgCl_2$ which is consumed during the electrolysis, the material charged to the cell substantially will be constituted of $MgCl_2$, usually to at least 94 percent by weight. The remaining salts thus will constitute a very small portion of the solid matter constituents of the brine to be prilled, and we have found that the process of the invention can be readily carried out using varying contents of such other salts as mentioned above. The total content of such other salts can however lower the solidification temperature of the brine to be prilled so that the best discharge temperature to be used with any given brine can only be determined appproximately on the basis of its content of water of hydration. However, in each actual case those skilled in the art will be in a position to determine after simple experiments the minimum discharge temperature to be used, since the brine will turn whitish and its viscosity will increase markedly at this temperature.

According to our observations the formation of shell fragments during prilling often is connected with the presence of small gas or vapor bubbles in the molten droplets at the moment when these leave the nozzle. The latter phenomenon can be caused by too high temperature of the brine and under such circumstances a great pressure drop across the nozzle can contribute to the formation of such shell fragments. When the temperature of the brine to be prilled is a little to low it will often cause the prills to take the form of small rods or the like malformations.

In respect of prilling technology in general reference is made to for instance "Nitrogen", no. 60, July/August 1969, page 29–33 published by the British Sulphur Corp., Ltd., London, England. When preparing prills according to the invention the material loss (dust) is very low. The cooling air from the prilling chamber passes a cyclone which collects this fine material. Normally this loss will constitute less than 0.5 percent by weight of the product prilled. Further this dustlike material can be utilized, for instance as seeding material in the prilling process and in this case is returned in its entirety to the process.

c. The drying operation, contrary to the prilling operation, is a well known operation in the preparation of magnesium chloride for electrolysis. The prills obtained according to the invention can be dried by methods which are basically known including certain methods that are often preferred, such as fluidized bed drying and shaft drying.

When drying in a shaft kiln we prefer to use prills of a size above about 4 mm and at least above 3 mm, since the pressure drop across the kiln using suitable gas velocities will approach an unacceptably high level when using prills of a size about 3 mm and less.

Prills of a size of about 3 mm actually are not particularly well suited for any of the two drying methods mentioned above, fluidized bed drying and shaft drying. However, we have found that it is possible to prepare prills of magnesium chloride hydrates having suitable sizes for shaft drying, for instance 4–6 mm prills. Likewise we have found that it is also possible to produce prills of quite uniform sizes which lend themselves excellently to fluidized bed drying such as 0.5–2 mm prills.

As is well known, magnesium chloride hydrates can be dehydrated to about 2 moles of $H_2O$ of $MgCl_2$ in an inert gas without substantial hydrolysis and liberation of HCl. Inert gases here means gases that do not react chemically with magnesium chloride at the actual temperature. Normally, air is used, however, also for instance certain combustion gases can be employed. We have found that prills produced according to the invention lend themselves excellently to be dehydrated to the dihydrate, this dehydration being effected without any substantial hydrolysis of $MgCl_2$.

In the case of shaft kiln drying we prefer to dehydrate with air to a degree of hydration somewhat above 2, about 2.3 for instance 2.3–2.5 moles of $H_2O$/mole of $MgCl_2$. A further drying in this step can result in partial hydrolysis of the hydrate and in addition undesired sintering may occur in the upper portion of the shaft, unless the hydrate added to the latter is exeptionally low in moisture, for instance contains less than 4 moles of $H_2O$ per mole $MgCl_2$.

In the fluidized bed dehydration process we prefer to dehydrate with air to a degree of hydration of about 2 moles of $H_2O$ per mole of $MgCl_2$. When preparing anhydrous magnesium chloride the number of stages using HCl gas can then be reduced to a minimum. In the dehydration with HCl gas it can be possible, depending on the requirements as to the MgO and $H_2O$ content, to operate using only two fluidized bed stages, although normally three stages or more would be required if a substantially anhydrous product is desired containing less than 0.2 percent MgO.

In the following, examples will be given illustrating the process of the invention. To serve this purpose these examples are presented in table form.

Table 1 shows data relating to the preparation of 4–6 mm prills, that is relatively large prills. Table 2 shows data relating to the dehydration of these prills in a shaft kiln. Table 3 shows data relating to the preparation of small prills, and Table 4 relates to the dehydration of these prills in fluidized bed.

Analysis of oxygen and hydrogen content in the product and the raw materials are given as % MgO and % $H_2O$, respectively, which will here be understood to refer to total combined oxygen and total combined hydrogen, respectively.

Prills dried with air as indicated in Table 4, were further dehydrated with HCl gas in fluidized bed, the dimensions and characteristics of which can be seen from Table 4, to produce substantially anhydrous magnesium chloride. Three fluidized beds in series were used, one above the other, the HCl gas being flows upwards through the fluidized beds countercurrently with the prills to be dehydrated. The temperatures of the three fluidized beds were 330° C, 250° C and 180° C, respectively. The gas flow rate (V) was 0.5 $Nm^3/m^2$/second.

Result:

The almost completely dehydrated product consisted of mechanically strong, abrasion resistant prills of substantially the same grain size distribution as the starting material (Table 3). Analysis showed a moisture content averaging less than 0.4% $H_2O$ and an oxide content averaging less than 0.2% MgO. — The loss in the form of dust to the cyclone was less than 2 percent.

In all of the above described examples comprising dehydration with HCl gas there was utilized a substantially pure HCl gas having a moisture content of 0.5 percent by weight. However, the HCl gas may well contain inert gases as the latter do not effect the equilibrium determining the product quality in the dehydration of magnesium chloride hydrate. Depending on the

TABLE 1

Preparation of large prills of Magnesium chloride hydrates in a prilling tower

| Test No. | Spraying temp., °C.[a] | Spraying pressure, mm. Hg[b] | Sieve hole diam., mm. | Height of fall, m. | Mole ratio, $H_2O$/$MgCl_2$ | Prill size, mm. |
|---|---|---|---|---|---|---|
| 1 | 183 | 100 | 1.2 | 25 | 4.3 | 1.5–3 |
| 2 | 141 | 200 | 1.2 | 25 | 4.9 | 2–3 |
| 3 | 130 | 200 | 1.2 | 25 | 5.1 | 3–4 |
| 4 | 124 | 280 | 1.2 | 25 | 5.5 | 2–3 |
| 5 | 118 | 110 | 2.5 | 25 | 5.7 | 4–6 |
| 6 | 118 | 10 | 4.0 | 25 | 5.9 | 4–6 |

[a] The "spraying temperature" is the temperature of the brine immediately before being sprayed.
[b] The "spraying pressure" is the pressure drop across the sieve plate. The cooling gas in all the tests was air of room temperature.

TABLE 2

Shaft kiln dehydration of prills prepared according to Table 1

| | Starting material (prills), percent MgO | Dehydration with air | | | | | Dehydration with HCl gas | | | | | After HCl dehydration | |
|---|---|---|---|---|---|---|---|---|---|---|---|---|---|
| | | Kgms. air per kmole $MgCl_2$ | Prill-temp. | | Treatment time, minutes | After air treatment | | Kmoles gas per kmole $MgCl_2$ | Prill-temp. | | Treatment time, minutes | | |
| Test No. | | | Bottom, °C. | Top, °C. | | $H_2O$/$MgCl_2$ | MgO, percent | | Bottom, °C. | Top, °C. | | $H_2O$, percent | MgO, percent |
| 1 | 0.14 | 5,000 | 152 | 110 | 350 | 2.0 | 0.50 | 35 | 320 | 155 | 280 | 0.0 | 0.18 |
| 2 | 0.06 | 5,500 | 136 | 100 | 315 | 2.8 | 0.50 | 50 | 290 | 135 | 320 | 0.2 | 0.21 |
| 3 | 0.05 | 5,500 | 136 | 100 | 315 | 2.8 | 0.18 | 50 | 290 | 135 | 320 | 0.4 | 0.18 |
| 4 | 0.06 | 5,500 | 138 | 100 | 345 | 2.4 | 0.90 | 40 | 310 | 135 | 270 | 0.0 | 0.19 |
| 5 | 0.06 | 6,000 | 138 | 95 | 720 | 2.5 | 0.50 | 40 | 310 | 135 | 380 | 0.2 | 0.14 |
| 6 | 0.02 | 6,000 | 138 | 95 | 720 | 2.4 | 0.94 | 40 | 310 | 135 | 360 | 0.2 | 0.21 |

NOTE.—$H_2O$/$MgCl_2$ (in the seventh column) means moles of $H_2O$/mole of $MgCl_2$.

TABLE 3

Preparation of small prills of magnesium chloride hydrates

| Test No. | Spraying temp., °C. | Spraying pressure, mm. Hg | Nozzle diam., mm. | Disintegrating air, $Nm^3$/hour | Nozzle capacity, kg./hour | Height of fall, meters | Mole ratio, $H_2O$/$MgCl_2$ | Size distribution |
|---|---|---|---|---|---|---|---|---|
| 7 | 192 | Ca. 220 | 3.8 | 51 | 250 | 7 | 4.0 | 1.0–2.0 mm.: 7.2%. 0.5–1.0 mm.: 39.3%. 0.2–0.5 mm.: 45.0%. 0.125–0.2 mm.: 7.8%. 0.063–0.125 mm.: 0.7%. |
| | | (Type of nozzle: "Full jet" SS10) | | | | | | |
| 8 | 192 | Ca. 500 | 3.2 | 50 | 275 | 7 | 4.5 | 1.0–2.0 mm.: 9.7%. 0.5–1.0 mm.: 38.6%. 0.2–0.5 mm.: 41.2%. 0.125–0.2 mm.: 7.9%. 0.063–0.125 mm.: 2.6%. |
| | | (Type of nozzle: "Full jet" SS10) | | | | | | |
| 9 | 195 | Ca. 500 | 3.2 | 45 | 275 | 7 | 4.6 | 1.0–2.0 mm.: 7.9%. 0.5–1.0 mm.: 56.2%. 0.2–0.5 mm.: 34.3%. 0.125–0.2 mm.: 1.6%. 0.063–0.125 mm.: 0.0%. |
| | | (Type of nozzle: "Full jet" SS10) | | | | | | |
| 10 | 194 | Ca. 500 | 5.3 | 18 | 375 | 15 | 4.5 | 1.0–2.0 mm.: 35.6%. 0.5–1.0 mm.: 50.9%. 0.2–0.5 mm.: 12.6%. 0.125–0.2 mm.: 0.6%. 0.063–0.125 mm.: 0.1%. |
| | | (Type of nozzle: "Hollow cone" SS15) | | | | | | |
| 11 | 195 | Ca. 500 | 5.3 | 18 | 375 | 15 | 4.6 | 1.0–2.0 mm.: 30.8%. 0.5–1.0 mm.: 43.0%. 0.2–0.5 mm.: 23.0%. 0.125–0.2 mm.: 2.7%. 0.063–0.125 mm.: 0.5%. |
| | | (Type of nozzle: "Hollow cone" SS15) | | | | | | |

TABLE 4

Air dehydration in fluid bed of prills prepared according to Table 3

| Test No. | Bed plate (grid) | | L/D | Drying air | | | | Starting material | | Product | |
|---|---|---|---|---|---|---|---|---|---|---|---|
| | Hole diam, mm. | Hole area, percent | | V | f | Temp. in,° C. | Temp. out,° C. | Moles H₂O per mole MgCl₂ | MgO | Moles H₂O per mole MgCl₂ | MgO |
| 7 | 2.0 | 4.15 | 2.25 | 0.61 | 11.1 | 470 | 165 | 4.0 | 0.12 | 2.0 | 0.98 |
| 8 | 2.0 | 4.0 | 2.0 | 0.94 | 16.7 | 270 | 145 | 4.5 | 0.24 | 2.1 | 0.94 |
| 9 | 4.76 | 4.0 | 2.0 | 0.91 | 16.7 | 450 | 155 | 4.6 | 0.23 | 2.1 | 0.90 |
| 10 | 2.0 | 4.0 | 2.0 | 0.91 | 16.7 | 300 | 155 | 4.5 | 0.28 | 2.0 | 1.10 |
| 11 | 4.76 | 6.0 | 2.0 | 0.91 | 16.7 | 400 | 155 | 4.6 | 0.20 | 2.1 | 1.04 |

NOTE.—In the term L/D, L represents the critical bed height and D the diameter of the fluidization zone. V represents the air velocity (Nm.³/m.² second) as calculated for the empty fluidization chamber. $f = L$/minimum velocity for fluidization. The average particle residence time (dehydration time) in all these tests was between 0.3–0.6 hour.

actual requirements in respect of the MgO and the H₂O content of the product the moisture content of the HCl gas can be somewhat higher than the 0.5 percent indicated above.

1. A process for preparing substantially anhydrous MgCl₂ prills from hydrated MgCl₂ which comprises:
   a. heating MgCl₂ hydrate having a degree of hydration of about 3.8 to 6.2 moles of H₂O per mole of MgCl₂ to render it liquid;
   b. forming droplets from said liquid MgCl₂ hydrate;
   c. cooling said droplets in a prilling tower to form prills above about 0.15 mm., having substantially the same degree of hydration as the MgCl₂ in step (a);
   d. partially dehydrating said prills without substantial hydrolysis and liberation of HCl with a substantially inert drying gas by contacting said prills with said gas, and
   e. completing dehydration of said prills substantially to the anhydride using HCl gas of sufficiently low moisture content to effect said dehydration by contacting said prills with said HCl gas.

2. A process according to claim 1, wherein the degree of hydration of MgCl₂ in step (a) is about 4.0 to 5.8 moles of H₂O per mole of MgCl₂.

3. A process according to claim 2 wherein the prill size is 0.15-3 mm. and the degree of hydration of MgCl₂ in step (a) is 4.0 to 4.7 moles of H₂O per mole of MgCl₂.

4. A process according to claim 3 wherein the prills are dehydrated in steps (d) and (e) in a fluidized bed.

5. A process according to claim 3 wherein the prill size is 0.5 to 2 mm.

6. A process according to claim 2, wherein the prill size is 2 to 6 mm. and the degree of hydration of MgCl₂ in step (a) is 4.8 to 5.8 moles of H₂O per mole of MgCl₂.

7. A process according to claim 1 wherein said liquid MgCl₂ hydrate, containing about 4 moles of H₂O per mole of MgCl₂, is sprayed at a temperature of about 190° C in a prilling tower countercurrently with a cooling gas at room temperature as a cooling medium.

8. A process according to claim 2, wherein said liquid hydrate, containing about 4 moles of H₂O per mole of MgCl₂, is sprayed at a temperature of about 190° C in a prilling tower countercurrently with a cooling gas at room temperature as a cooling medium.

9. A process according to claim 1, wherein the prills resulting from the partial dehydration of step (d) have a degree of hydration of about 2 moles of H₂O per mole MgCl₂.

10. A process according to claim 1, wherein the partial dehydration of step (d) is carried out in a single-stage fluidized bed, and the HCl dehydration in step (e) is carried out in a three-stage fluidized bed.

11. A process according to claim 1, wherein the prill size is 4–6 mm. and the prills are dehydrated in steps (d) and (e) by shaft kiln drying.

12. A process according to claim 11, wherein the prills resulting from step (c) are dried with air in step (d) to about 2.3 moles of H₂O per mole of MgCl₂.

* * * * *